United States Patent
Augustine

(10) Patent No.: US 7,063,636 B2
(45) Date of Patent: Jun. 20, 2006

(54) MECHANICALLY LINKED ACTIVE STEERING SYSTEM

(75) Inventor: Michael J. Augustine, Mayville, MI (US)

(73) Assignee: Delphi Technologies, Inc., Troy, MI (US)

( * ) Notice: Subject to any disclaimer, the term of this patent is extended or adjusted under 35 U.S.C. 154(b) by 191 days.

(21) Appl. No.: 10/869,249

(22) Filed: Jun. 15, 2004

(65) Prior Publication Data

US 2004/0251061 A1    Dec. 16, 2004

Related U.S. Application Data

(60) Provisional application No. 60/479,250, filed on Jun. 16, 2003.

(51) Int. Cl.
F16H 3/72      (2006.01)
B62D 5/04      (2006.01)

(52) U.S. Cl. .............. 475/3; 475/4; 180/446
(58) Field of Classification Search .......... 475/1, 475/2, 3, 4, 7; 180/422, 443, 444, 446
See application file for complete search history.

(56) References Cited

U.S. PATENT DOCUMENTS

| 4,306,513 | A | * | 12/1981 | Legrand | 475/3 |
| 4,658,927 | A | * | 4/1987 | Kanazawa | 180/446 |
| 4,871,040 | A | | 10/1989 | Zuraski et al. | 180/422 |
| 5,119,898 | A | | 6/1992 | Eckhardt et al. | 180/422 |
| 5,236,335 | A | * | 8/1993 | Takeuchi et al. | 180/446 |
| 5,704,446 | A | | 1/1998 | Chandy et al. | 180/446 |
| 6,041,887 | A | * | 3/2000 | Kojo et al. | 180/446 |
| 6,135,233 | A | | 10/2000 | Yamauchi | 180/443 |
| 6,942,057 | B1 | * | 9/2005 | Boloorchi et al. | 180/446 |
| 2001/0029800 | A1 | | 10/2001 | Bucholz et al. | 74/425 |
| 2002/0029922 | A1 | | 3/2002 | Richardson et al. | 180/444 |
| 2005/0173184 | A1 | * | 8/2005 | Kojima et al. | 180/444 |

* cited by examiner

Primary Examiner—Sherry Estremsky
(74) Attorney, Agent, or Firm—Michael D. Smith

(57) ABSTRACT

An active steering system with variable assist includes a differential actuator having an input gear and an output gear. The differential actuator has a default kinematic relationship between the input gear and the output gear such that magnitude of an output speed and an output torque is approximately equal to a magnitude of an input speed and an input torque with opposing directions. The system also includes an input device that is in operable communication with the differential actuator and an output device that is in operable communication with the differential actuator. The differential actuator is operable to vary a ratio between the input device and the output device. The system also includes a steering mechanism that is in operable communication with the differential actuator and the steering mechanism is configured to reverse the opposing directions to the output device.

23 Claims, 2 Drawing Sheets

MECHANICALLY LINKED ACTIVE STEERING SYSTEM

CROSS-REFERENCE TO RELATED APPLICATIONS

The present application claims the benefit of the date of the earlier filed provisional application, having U.S. Provisional Application No. 60/479,250, filed on Jun. 16, 2003, which is incorporated herein in its entirety.

BACKGROUND OF THE INVENTION

The present disclosure relates generally to vehicle steering control systems and, more particularly, to a mechanically linked active steering system.

Conventional vehicular steering systems have an articulated mechanical linkage connecting an input device (e.g., steering wheel or hand-wheel) to a steering actuator (e.g., steerable road wheel). Even with power assisted steering in an automobile, for example, a typical hand-wheel motion directly corresponds to a resulting motion of the steerable road wheels, substantially unaffected by any assist torque.

However, for a vehicular steering system with active steering, such as that used in an automotive front-controlled steering system, a given motion of the hand-wheel may be supplemented by an additional motion, such as that from a differential steering actuator, which translates into a motion of the steerable road wheels that does not necessarily correspond to the given motion of the hand-wheel. Consequently, when the differential steering actuator is inactive, the motion of the steerable road wheels directly corresponds to the hand-wheel motion due to the articulated mechanical linkage, just as in conventional systems.

The term "active steering" relates to a vehicular control system, which generates an output that is added to or subtracted from the front steering angle, wherein the output is typically responsive to the yaw and/or lateral acceleration of the vehicle. It is known that, in some situations, an active steering control system may react more quickly and accurately than an average driver to correct transient handling instabilities. In addition, active steering can also provide for continuously variable steering ratios in order to reduce driver fatigue while improving the feel and responsiveness of the vehicle. For example, at very low speeds, such as that which might be experienced in a parking situation, a relatively small rotation of the hand-wheel may be supplemented using an active steering system in order to provide an increased steering angle to the steerable road wheels.

Prior devices act to modify the relationship between driver input and steering output by providing a supplemental power source within the steering system that actively augments the position of the wheels or acts to augment the control of the primary steering power source. Examples include (1) the addition of a second axially actuated device in addition to the primary axial translating device (e.g., hydraulic assisted steering rack), and (2) addition of a motor driven differential device between the operator and the steering valve of a typical hydraulic power steering system. In each case, additional power is added to the system through the added component to affect steering augmentation and in each case a portion of that power is transmitted to the operator as secondary feedback. Also noteworthy is the requirement in each case that the driver provide the upstream reaction to the system input in order for the desired steering change to be realized. Additionally, in case number two, any lash in the differential will be directly felt by the operator.

Without operator reaction, most of the system input will be directed to the operator input device (i.e., steering wheel) and result in no change to the vehicle path. Conversely, steer-by-wire systems have the ability to directly control the primary steering actuator to affect the operator-to-steerable device kinematic relationship. However, steer-by-wire systems do not maintain a full-time mechanical link between the operator and the steerable device.

Thus, it is desirable to provide active steering orientation of the steerable device directly, as in by-wire systems, and maintain a mechanical link between the operator input and steerable device, as in prior active steer systems, while isolating the operator to some degree from such steerable device orientation modifications and associated feeback.

SUMMARY OF THE INVENTION

Exemplary embodiments of the invention include an active steering system with variable assist, the system includes a differential actuator having an input gear and an output gear. The differential actuator has a default kinematic relationship between the input gear and the output gear such that magnitude of an output speed and an output torque is approximately equal to a magnitude of an input speed and an input torque with opposing directions. The system also includes an input device that is in operable communication with the differential actuator and an output device that is in operable communication with the differential actuator. The differential actuator is operable to vary a ratio between the input device and the output device. The system also includes a steering mechanism that is in operable communication with the differential actuator and the steering mechanism is configured to reverse the opposing directions to the output device.

Exemplary embodiments of the invention include a method of conditioning an input torque, the method includes inputting a torque and transmitting the torque through a differential actuator. The method also includes selectively varying an input to output ratio through the differential actuator with the differential actuator having a default kinematic relationship such that magnitude of an output speed and an output torque is approximately equal to a magnitude of an input speed and an input torque with opposing directions. The method also includes configuring a steering mechanism to reverse the opposing directions to the output device and the steering mechanism is in operable communication with the differential actuator.

BRIEF DESCRIPTION OF THE DRAWINGS

Referring to the exemplary drawings wherein like elements are numbered alike in the several Figures.

DETAILED DESCRIPTION

Figure 1:
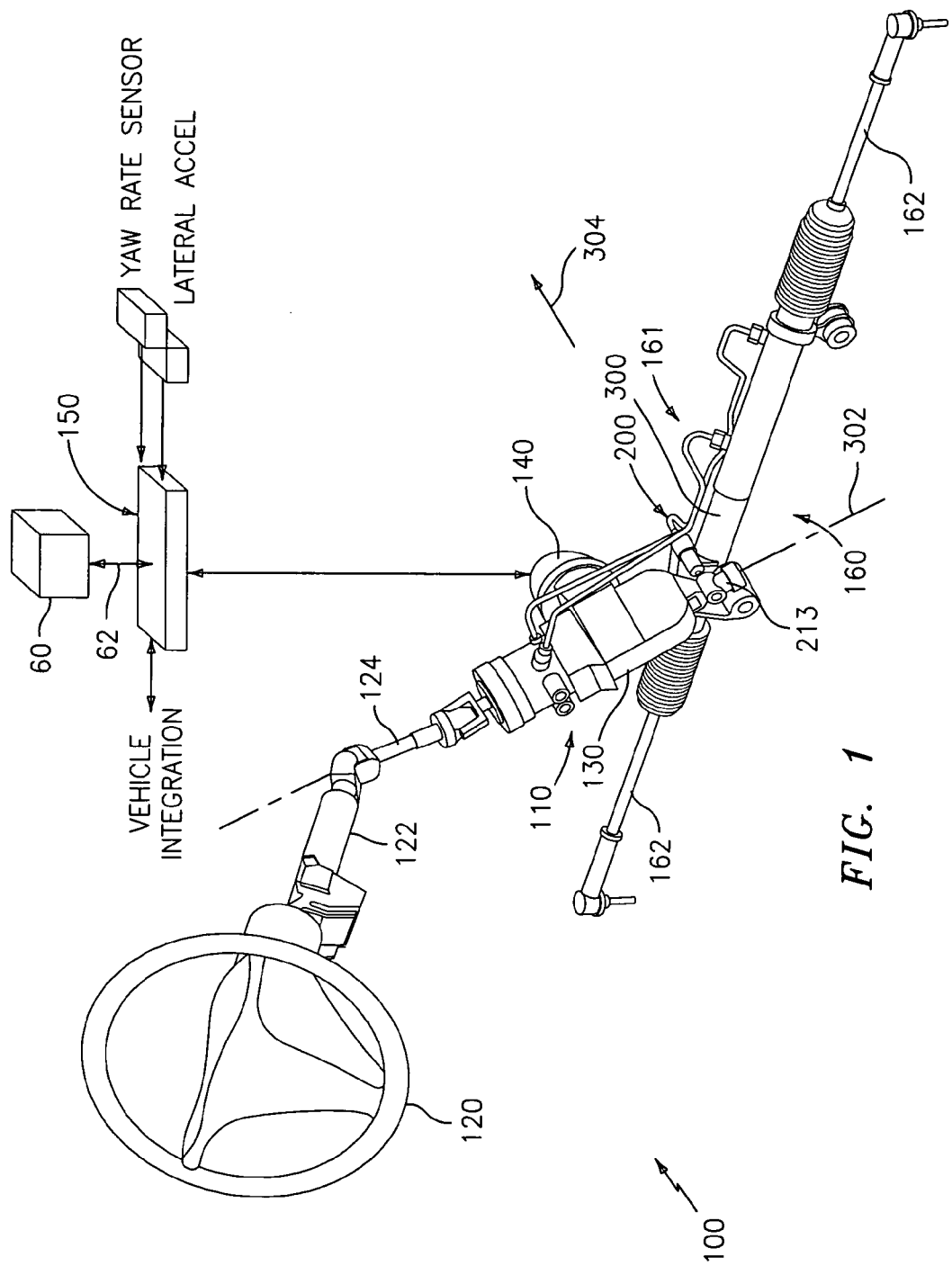
FIG. 1 shows a top level block diagram depicting an exemplary embodiment of an active steering system for a vehicle.

Referring now to FIG. 1, an active steering system 100 is shown and discussed. The system utilizes an electro-mechanical actuator, in this instance, a differential steering actuator 110, and a control unit 150 executing control algorithms, responsive to input signals including but not limited to vehicle speed, yaw and lateral acceleration sensors hand wheel position, and motor position sensors to provide both variable ratio and stability control. Control unit 150 communicates with a storage medium through a data signal 62. In an exemplary embodiment, variable ratio is a control algorithm configured to: reduce driver workload to maneuver vehicle, improve steering feel at various speeds and driving conditions, and change steering feel at all speeds based on the amount and rate of steering input. In yet another exemplary embodiment, stability control is a control algorithm configured to: reduce oversteer by leading the driver with countersteer, start vehicle correction before brake-based stability system is activated reduce obtrusiveness of brake based stability systems integrate with brake-based stability systems to allow optimization of brake and steering systems to reduce stopping distances.

The following description refers directly to the embodiment of FIG. 1 and is not intended to limit the possible embodiments to this specific configuration. The active steering system 100 includes, but is not limited to differential steering actuator 110, with an electric motor 140 and gear train or differential shown generally at 130. An input device, such as a steering wheel 120, for operator input is coupled to a mechanical input of the differential steering actuator 110 to facilitate combination with the output of the electric motor 140. Active steering system 100 further includes control unit 150 and various sensors interfaced with the control unit 150. The various sensors are operatively coupled with control unit 150 to measure and transmit respective sensed parameters to the control unit 150.

The differential steering actuator 110 is further coupled with a steering mechanism 160, which includes a power assist mechanism 161 that transfers inputs to output shafts 162 providing a force assistance to oppose system and vehicle loads to aid an operator in achieving the desired output. The output shaft 162 is operatively connected to an output device, such as a steerable wheel (not shown), to direct the vehicle. Operator input is provided through steering wheel 120 that is connected to a steering column 122. The steering column 122 is connected to the steering actuator 110 through an intermediate shaft 124. The steering actuator 110 is connected to steerable wheels (not shown) through tie rods or output shafts and corresponding steering knuckles operably communicating with respective steerable wheels (not shown).

It will be appreciated that while in an exemplary embodiment as disclosed herein the power assisted steering mechanism utilizes a hydraulic configuration to provide assist torque, other configurations are possible for example an electric power assist could also be employed. Such a differential steering actuator is disclosed in U.S. patent application Ser. No. 09/812,240, U.S. Patent Publication No. 2002-0029922 A1 the contents of which are incorporated by reference herein in their entirety. An illustrative configuration that employs hydraulic assist may be found in U.S. Pat. No. 4,871,040 the contents of which are incorporated by reference herein in their entirety. An illustrative electric power steering system that provides assist torque to aid the driver is disclosed in U.S. Pat. No. 5,704,446 the contents of which are incorporated by reference herein in their entirety.

The steering actuator 110 is essentially a hydraulically assisted rack and pinion gear with an electric motor driven differential 130 embedded within the hydraulic circuit. The hydraulic system can be activated by both operator and motor inputs. Embedding the differential within the assist loop allows friction associated with the differential to have little impact on the steering torque felt by the operator as the assist function reacts most of this friction. Any lash present in the differential and any vibration generated by the differential during motor activation will be attenuated and filtered by the damping and compliance properties of the assist servo located between the differential and the operator. The differential could also be employed between the operator and the assist loop, however the added friction associated with the differential will have a direct affect on steering feel, any lash within the differential will be felt by the operator, and motor generated vibration can be more readily transmitted to the input device and operator.

The hydraulic valve details are as described in U.S. Pat. No. 4,871,040 with a differential input gear substituted in place of the helical pinion gear portion of the aforementioned valve assembly. The differential 130 is a compound (stepped) planetary type, composed of an input gear, a minimum of one planetary gear with two gears per planet shaft, carrier with integral worm gear, worm, and output gear with integral pinion. The input and output gears may be internal or external gears or any combination of the same. Motor path transmission may be realized through any relatively non-backdrivable means including active or passive brakes with backdrivable gearing. Relative non-backdrivability is required to insure that the motor output sufficiently exceeds and back torque from input or output sides of the differential. It can be applied to wheeled and non-wheeled vehicles.

Figure 2:
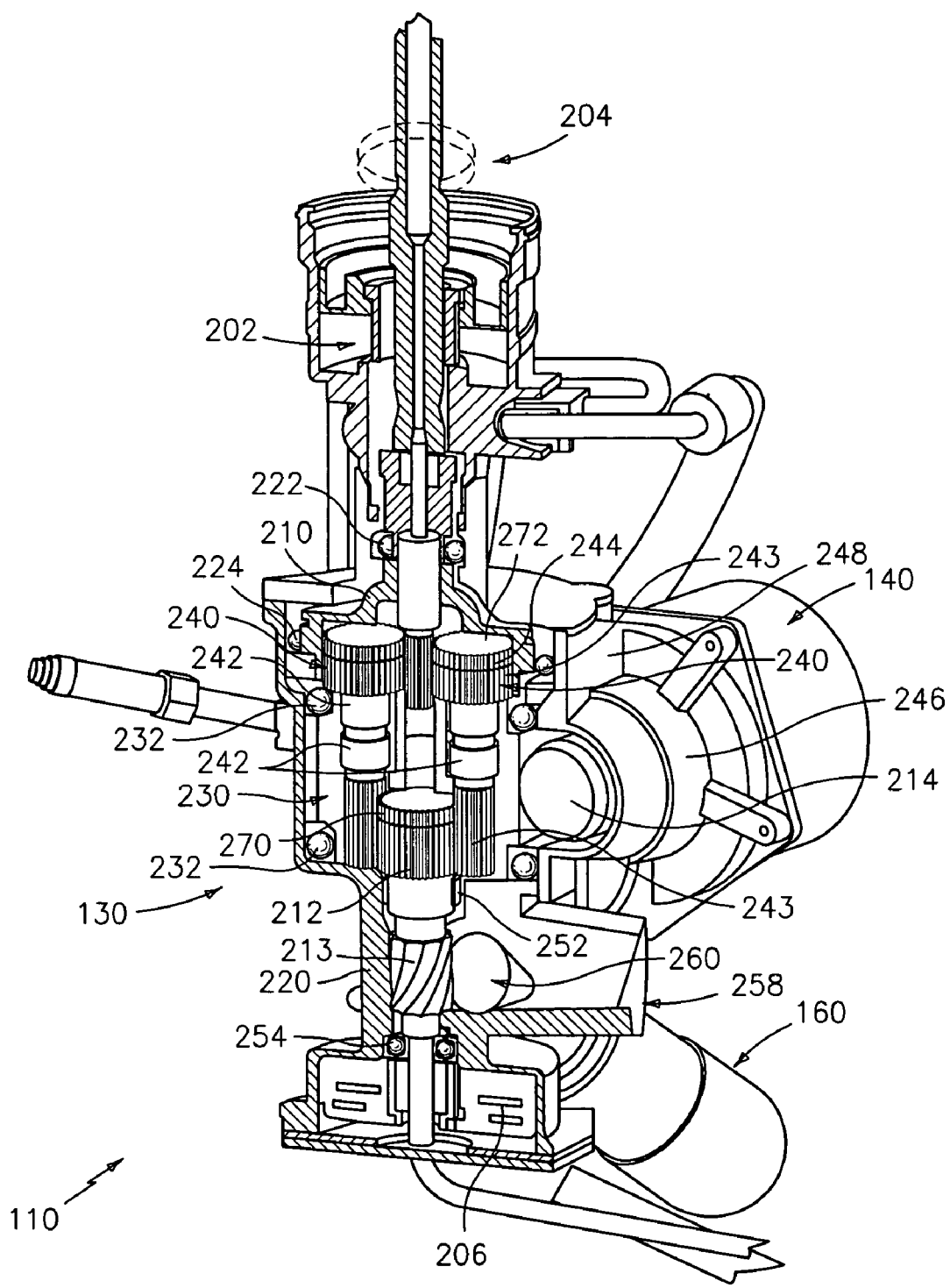
FIG. 2 is a cross section view to show the structure of an exemplary embodiment for a steering apparatus employed in the active steering system of FIG. 1.

Referring now to FIG. 2, steering actuator 110 is illustrated in greater detail. A related mechanism is disclosed in U.S. Pat. No. 6,135,233, the contents of which are incorporated by reference herein in their entirety. U.S. Pat. No. 6,135,233 differential discloses a specific simple epicyclic differential having a speed and torque change at the output with respect to the input, however, the differential is not delashed.

A exemplary embodiment of steering actuator 110 includes a valve activated hydraulic power assist device shown generally at 200 in FIG. 1 for orienting the steerable wheels and reacting to external loads. Differential device 130 is disposed between a steering valve 202 and the power assist device 200. The differential 130 acts as a positive mechanical link between the operator and the steerable device.

An electric motor 140 with a relatively non-backdrivable geared interface (e.g., with or without a normally closed brake) is a third input to differential 130 for modifying the force and motion relationship between the primary assist (e.g., steering mechanism 160) and the operator. A first position sensor 204 is located at the operator input to the differential 130 to monitor operator input magnitude and speed shown generally at 204 in phantom. A second position sensor 206 is disposed between the differential 130 and the steerable device (and/or within motor 140) to monitor differential output position and speed.

A hydraulic pump and a hydraulic reservoir (both not shown) are included to feed hydraulics in both the steering valve 202 and power assist steering mechanism 161. An electronically controlled valve torque supplementing device may be included but not shown for control of steering valve 202 and power assist steering mechanism 161. For example, U.S. Pat. No. 5,119,898, issued 9 Jan. 1992 describes a hydraulic power steering system manufactured by General Motors Corporation, and identified by the tradename MAGNASTEER™ including a steering gear in which an electromagnetic mechanism is selectively operable to vary the performance characteristics of a conventional proportional control valve of the steering gear.

Vehicle state sensors to monitor vehicle dynamic conditions (velocity, yaw, and the like) are in communication with actuator 110 via controller 150 and power distribution equipment to implement system functionality while a computer based database and algorithms define kinematic and kinetic relationship between operator input and steering orientation/effort based on vehicle state and sensor data.

FIG. 2 illustrates an exemplary embodiment of steering actuator 110 using an input gear 210, which is illustrated as an internal gear, at the operator input (valve) side of the differential 130 and an output gear 212, which is illustrated as an external gear, at the output (pinion) side. This combination results in a direction reversal between the input and output rotations, that is accounted for in the downstream steering componentry (e.g., rack and pinion helix angle, rack tooth interface location, valve-to-power cylinder relationship, and knuckle steer arm orientation with respect to kingpin) to establish the desired operator input to steering output kinematic relationship.

In an exemplary embodiment, a default kinematic relationship through differential actuator 130 has a magnitude of the output speed and torque that is equal or approximately equal (within about 20% of being equal is what is meant by the word approximately) to a magnitude of the input speed and torque with opposing directions. Thus, the input to output ratio is approximately 1:−1. If the ratio is not near approximately 1:−1, it may be necessary to adjust other steering parameters, such as torsion bar rate, valve profile, power piston area, pinion size, etc. to establish desired kinetic relationship between driver effort and road forces, including under conditions of hydraulic power loss.

Differential 130 is in operable communication with the steering mechanism 160, which includes a rack and pinion mechanism, an integral gear with steering linkage, or other steering components that convey the assist force to the steerable device (not shown). The steering mechanism 160 is configured to provide the correct sense to the steerable device (not shown) corresponding to driver input at handwheel 120. In an exemplary embodiment, this means that that the input to output ratio through the differential is approximately 1:−1 and the input to output ratio through the steering mechanism is approximately −1:1. Thus, the overall input to output ratio from the handwheel 120 to the steerable device (not shown) is approximately 1:1.

The differential 130 behaves similarly when differential 130 is inverted and the internal gear 210 is at the output side and the external gear 212 is at the input side with a reciprocal base differential ratio. The differential 130 behaves differently when the input and output (valve and pinion) sides of the differential 130 are both internal or both external gears. In this case there is no direction reversal, and the ratio cannot be 1:−1 or even near 1:−1 practically. In general, such a speed changing type requires greater carrier speed to realize a given range of input-to-output ratios. Additional gearing may be incorporated between the electric motor 140 and a worm 214 to limit motor speed and torque requirements. As with the reversing type discussed above, overall steering kinematic and kinetic steering relationships can be modified by adjusting other steering system parameters in an attempt to optimize the overall active steering system.

FIG. 2 shows position sensor 206 disposed below a pinion 213. This position sensor 206 can be replaced with a motor position sensor, or can be retained for redundancy. If the position sensor 206 is located at the motor, then the position sensor 206 can function by either sensing a position of a motor shaft (not shown), which includes counting the revolutions of the shaft or can also sense a carrier 230 (described in more detail below) position.

A second position sensor 204, shown in phantom, is located above the differential 130 with option for its placement within the differential housing or column or anywhere between.

The actuator components as shown in FIG. 2 are oriented and supported within a housing 220. The steering valve 202 is aligned axially by a lower bearing 222. Bearing 222 also acts as a support for the internal gear 210. Secondary support for the internal gear 210 and radial alignment of the valve 202 are accomplished with a bearing 224 located in the housing 220 or optionally with a bearing in carrier 230 of differential 130. The carrier 230 is supported and located by bearings 232 and housing 220. Planet gears 240 (two shown) are supported radially by bearings 242 within the carrier 230 and are retained axially between the internal gear 210 and housing 220. A minimum of one planetary gear 240 with two gears 243 per planet shaft are employed. The lower gear 243 of the two planetary gears 240 is in geared communication with output gear 212, which is illustrated as a spur gear, of pinion 213. The communication between gear 212 and planetary gear 243 is configured to reduce lash. Such a configuration is disclosed in U.S. patent application Ser. No. 09/728,244, U.S. Patent Publication No. 2001-0029800 A1 the contents of which are incorporated by reference herein in their entirety. As, illustrated in FIG. 2, output gear 212 of pinion 213 includes a delash gear 270 coaxially aligned therewith. Delash gear 270 is configured to reduce or eliminate lash felt at the steering input between coaxially aligned output gear 212 and gear 270 and lower planetary gear 243.

In an exemplary embodiment, each upper gear 243 of planetary gears 240 includes a corresponding planetary delash gear 272 coaxially aligned therewith in geared communication with gear 210 as illustrated in FIG. 2. Planetary delash gear 272 is configured to reduce or eliminate lash felt at the steering input between planetary delash gears 272 and internal gear 210.

The configuration of an exemplary embodiment of delash gears 270 and 272 and corresponding gears 212 and 210, respectively, as applied to active steering systems, is disclosed in copending U.S. Provisional patent application Ser. No. 10/868,612, & DP-311094, entitled DOUBLE FLANK DELASH GEAR MECHANISM, filed Jun. 15, 2004 friction details at each end of a corresponding planet shaft 244 are optionally included.

The worm 214 is located and supported by bearings (not shown) and housing 220 generally shown at 246. The electric motor 140 is mounted to the housing 220 and located radially by a splined interface 248 with the worm 214. The pinion 213 with ouput gear 212 is supported by upper and lower bearings 252 and 254, respectively in housing 220 and located proximate the lower bearing 232. A standard or rolling rack shoe with preload spring are included along with other standard rack and pinion components generally at 258 proximate rack 260. For the device shown in FIG. 2, it will be noted that the input speed and torque and output speed and torque can be equal.

The default ratio through the differential 130 is the ratio defined with worm gear (carrier) 230 stationary. This ratio along with the rack 260 and pinion 213 relationship, and steering knuckle geometry define the base overall steering ratio and is the ratio that the steering system will revert to when the electric motor 140 is off or uncommanded. Motor activation allows the overall steering ratio (OSR) to be continously varied, within limits, to make the wheels turn more and faster (lower OSR), or less and slower (higher OSR) for a given operator input, corresponding to low speed (parking) and high speed (highway) vehicle operation. The actuator 110 also has the ability to vary the ratio to the extent that the roadwheel angle can be reversed with respect to driver input if desired. This ability greatly improves the vehicle stability as the system can recognize incipient instability (based on vehicle state sensors) and augment steering angle to stabilize the vehicle.

In operation, the steering base ratio is defined as the default, non-powered steering ratio between the operator input and the steerable wheels that is mechanically derived. In non-powered mode, rotary operator input is transferred through differential steering actuator 110 to a rotary (Pitman arm) or linear (pinion 213 and rack 260) device that in turn transmits its motion to the steerable wheels (not shown). This rotary or linear device is equipped to provide the necessary power to provide assist to articulate the steerable device with low operator input when powered. It must be backdrivable to allow steering generated loads to be felt by the operator. Without power the operator steering effort is significantly increased. The motor drive portion of the differential 130 (i.e., motor 140) is required to be relatively non-backdrivable to insure that it does not provide a transmission path except as directed under motor power.

In normal, powered operation, the kinematic relationship between the operator and the steerable wheels is continuously variable. Operator input (torque), position, and speed, derived from sensor(s), are input into controller 150 along with vehicle speed and yaw rate. A database of predefined relationships relating vehicle speed, and operator input position and speed are used to establish the desired steering ratio. A second database relating vehicle speed to maximum stable yaw rate may be used to invoke stability correction when the stable value is exceeded. The stability correction is in addition to the variable ratio to define the desired instantaneous overall steering ratio. The steering valve geometry and compliance establishes the basic relationship between operator torque and steering assist power. This basic relationship is modified whenever either a ratio modification and/or a stability correction, and/or supplemental torque is invoked. In this situation the power fluid flow to the power assist is either increased or decreased, per the controller, to establish the required steering modification. The steering modification is monitored by comparison of signals from position sensor 206 at the differential 130 output and or motor 140 and position sensor 204 at the operator side of the differential 130 with respect to a predefined state relationship.

When the signals differ from the predefined relationship, the differential motor 140 is commanded to activate in proportion to the steering modification such that the motor driven differential input augments the valve output to the power assist while simultaneously modifying the input to output ratio. Supplemental torque is commanded in proportion to the motor command to counter the valve torque associated with motor input, resulting in reduction or elimination of torque modification feedback to the operator. Steering input position is also monitored with respect to motor commanded position to determine if the operator is providing reaction torque at the input device. This improves the overall control of the system and eliminates the possibility of a "run away" steering input device if the operator is not actively controlling the input, where the system could otherwise continue to command steering modifications that are not realized because the motor power is converted into steering input motion with no vehicle path change.

In an exemplary embodiment, the steering system operates by inputting a torque at handwheel 120 and transmitting the torque through differential 130. The steering system selectively varies the input to output ratio through the differential actuator 130. There is a sense changing kinematic relationship between the operator input and the output of the differential 130 to provide the desired end steering effect to input rotation relationship. The sense changed output requires that the steering mechanism 160 be configured to operate in opposite sense with reference to traditional steering linkages. This point will be illustrated by reference to an automotive application with a steering wheel and a rack and pinion mechanism. As illustrated in FIG. 1, a rack 300 of the rack and pinion is located longitudinally forward (illustrated by a forward direction 304) of a steered wheel axle centerline 302, with pinion 213 being located along centerline 302. This arrangement of the rack 300 and pinion 213 causes an operator's input to be reversed. Thus, because the input to output relationship through differential 130 is reversed by the sense changing differential, it is necessary to orient the pinion 213 such that it interfaces with the upper portion of the rack rod in order to produce roadwheel motion consistent with the steering wheel motion. In applications with the rack located rear of the steerable wheel axle centerline, the scenarios are reversed and a sense changing differential would not be practical. Similar scenario is applicable to other downstream steering mechanizations such as integral gear, etc.

There are numerous advantages to incorporating differential actuator 130, which is a sense changing differential, into an active steering system as compared to a speed changing differential. Typically steering geometry is defined based on road load management, and a compromise between steering responsiveness and steering safety. Optimum steering component geometry is chosen such that road loads are efficiently and effectively reacted with minimal structure within available space and with a compromise responsiveness. An overall steering ratio (OSR) results that is a ratio of handwheel angle over corresponding roadwheel angle. In relative terms a low OSR results in a quick reacting steering system with high load reaction, and a high OSR results in a slower reacting steering system with lower load reaction. Active steering systems allow the OSR to be variable by providing additional steering inputs actively by, for example, an electric motor input to the differential. When this input is absent, the OSR will be a default relationship of (OSR without differential×differential ratio). Application of a speed changing differential with this optimized steering geometry will either alter the default steering behavior away from the optimum, or require modifications to the optimized steering geometry to retain equivalent default steering behavior.

The range of active OSR is defined to provide reduced operator work at low vehicle speed, and enhanced safety at high vehicle speed, with sufficient bandwidth for stability correction. The choice of default OSR has performance implications over the active OSR range as well as the default condition. Choosing a low default OSR will require minimum motor generated steering augmentation for low vehicle speed operation (low OSR), but significant motor generated augmentation for high vehicle speed operation (high OSR) and stability correction. Low default OSR choices are limited by the sensitivity of the operator to OSR changes associated with any system fault condition, where the OSR will change from some active OSR to the default OSR.

Choosing a high default OSR will require maximum motor generated steering augmentation for low vehicle speed operation (high OSR), but significant motor generated augmentation for low vehicle speed operation (low OSR). An active steering system with a sense changing differential with a ratio near unity provides the ability to a combination of optimum OSR and balanced actuator performance demands over the active steering OSR range.

It will be appreciated that the use of first and second or other similar nomenclature for denoting similar items is not intended to specify or imply any particular order unless otherwise stated.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. An active steering system with variable assist, said system comprising:
    a differential actuator has an input gear and an output gear, and a default kinematic relationship between said input gear and said output gear is such that a magnitude of an output speed and an output torque is approximately equal to a magnitude of an input speed and an input torque with opposing directions;
    an input device is in operable communication with said differential actuator;
    an output device is in operable communication with said differential actuator, said differential actuator is operable to vary a ratio between said input device and said output device; and
    a steering mechanism is in operable communication with said differential actuator, said steering mechanism is configured to reverse said opposing directions to said output device.

2. The system of claim 1, wherein said differential actuator has rotatable mechanisms to vary said ratio between said input device and said output device.

3. The system of claim 1, wherein said steering mechanism includes a rack and pinion mechanism, a pinion of said rack and pinion mechanism is configured to reverse said opposing directions to said output device.

4. The system of claim 3 wherein said output gear is in operable communication with said pinion.

5. The system of claim 1, wherein said differential actuator is disposed between said input device and said steering mechanism.

6. The system of claim 1, further comprising a steering valve disposed between said input device and said differential actuator.

7. The system of claim 6, further comprising a controller in communication with said differential actuator, said steering valve and said controller are configured to provide a supplement torque to said input device, said supplemental torque is in proportion to a motor current command.

8. The system of claim 1, further comprising a position sensor disposed between said input device and said differential actuator.

9. The system of claim 1, further comprising a position sensor disposed between said differential actuator and said output device.

10. The system of claim 1, further comprising a position sensor disposed at a motor, said motor in operable communication with said differential actuator.

11. The system of claim 1, further comprising a power assist mechanism coupled to said differential actuator and said output device, said power assist mechanism provides an assist torque responsive to activation of a valve.

12. The system of claim 1, further comprising a power assist mechanism coupled to said differential actuator and said output device, said power assist mechanism provides an assist torque responsive to a torque sensor.

13. The system of claim 1, wherein said input gear is an internal gear and said output gear is an external gear.

14. The system of claim 1, wherein said input gear is an external gear and said output gear is an internal gear.

15. The system of claim 1, wherein said input gear is in operable communication with a first set of planetary gears, said output gear is in operable communication with a second set of planetary gears, said first set of planetary gears are in operable communication with said second set of planetary gears.

16. The system of claim 15, wherein said input gear is delashed with said first set of planetary gears and said output gear is delashed with said second set of planetary gears.

17. The system of claim 1, further comprising a controller that is configured to control said ratio between said input device and said output device.

18. A method of conditioning an input torque and position, the method comprising:
    inputting a torque;
    transmitting said torque through a differential actuator;
    selectively varying an input to output ratio through said differential actuator, said differential actuator having a default kinematic relationship such that magnitude of an output speed and an output torque is approximately equal to a magnitude of an input speed and an input torque with opposing directions; and
    configuring a steering mechanism to reverse said opposing directions to said output device, said steering mechanism being in operable communication with said differential actuator.

19. The method of claim 18, further comprising sensing an operator input magnitude and speed.

20. The method of claim 18, further comprising sensing a differential output position and speed.

21. The method of claim 18, further comprising sensing a position of a motor shaft.

22. The method of claim 18, further comprising sensing a carrier position.

23. The method of claim 18, further comprising activating a supplemental torque at an input device in response to a motor current command.

* * * * *